Figure 1:
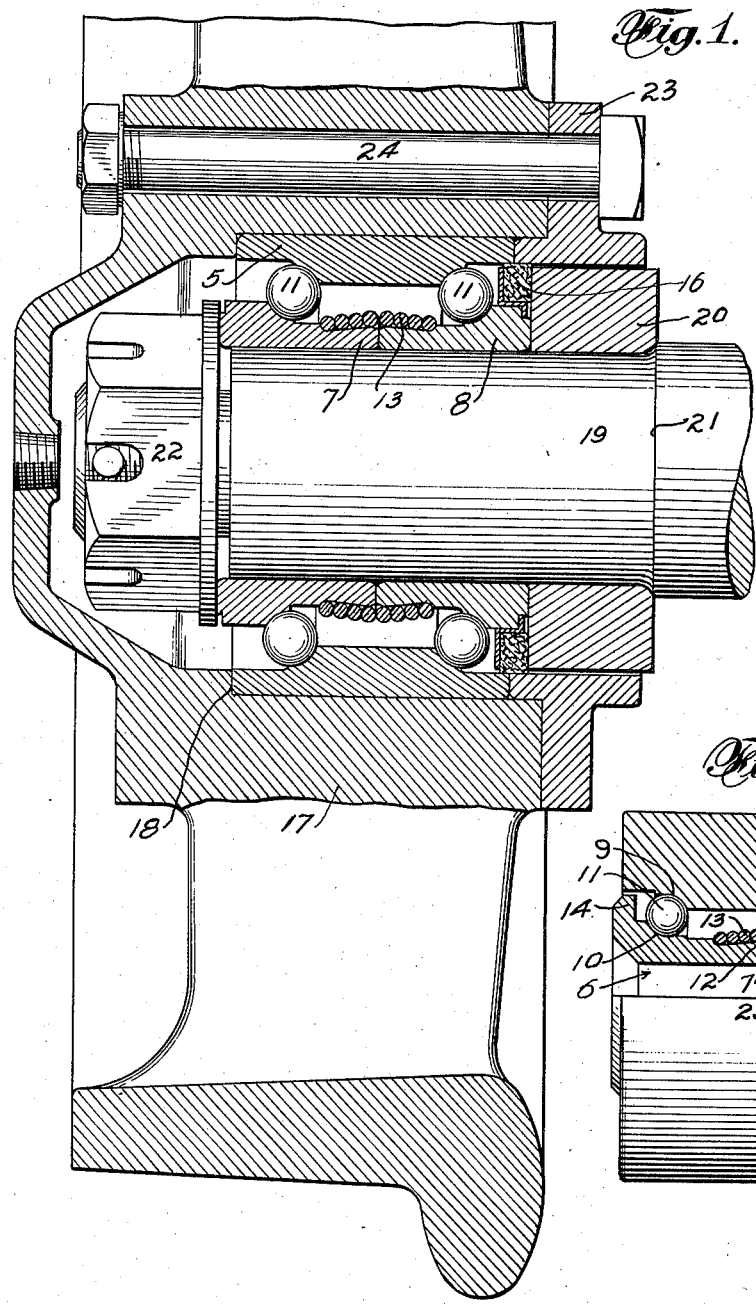

June 21, 1938.   J. W. SMITH   2,121,237
BEARING
Filed Feb. 8, 1935

INVENTOR
John W. Smith
BY
ATTORNEYS

Patented June 21, 1938

2,121,237

UNITED STATES PATENT OFFICE 2,121,237

BEARING

John W. Smith, New Britain, Conn., assignor to The Fafnir Bearing Company, New Britain, Conn., a corporation of Connecticut Application February 8, 1935, Serial No. 5,611

7 Claims. (Cl. 308—196)

My invention relates to an anti-friction bearing.

It is an object of the invention to provide a simple bearing which may be cheaply manufactured and very readily assembled and disassembled and which, when assembled, may be handled as a unit.

Other objects and features of the invention will become apparent or will be hereinafter pointed out.

In the drawing which shows, for illustrative purposes only, preferred forms of the invention—

Figure 2:
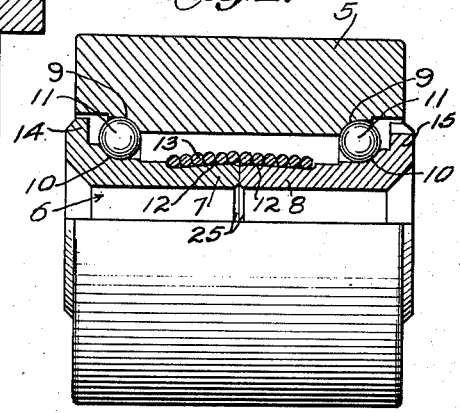

Fig. 1 is a sectional view of an anti-friction bearing illustrating features of the invention and mounted in a mine car wheel; and Fig. 2 is a side view in quarter section of a slightly modified form of bearing.

In said drawing 5 indicates an outer bearing ring means while 6 indicates generally inner bearing ring means. One of said ring means is formed in separable parts and in the form shown the inner ring means 6 comprises two separate inner rings or ring parts 7—8, which are axially aligned and preferably arranged in end-abutting relationship to each other. The outer ring 5 is provided with spaced-apart angular contact raceways 9—9, the angles of contact converging outwardly of said ring. Each of the inner ring parts 7—8 is provided with an angular raceway 10, complementary to the two raceways 9—9. Anti-friction bearing members 11—11 are interposed between the spaced-apart complementary raceways, so that when the bearing is assembled it comprises a double-row angular contact bearing. The two ring parts 7—8 are held together preferably so as to be readily detachable but sufficiently secure so that the bearing when assembled is a unit handling bearing and may be shipped, applied and handled without danger of coming apart.

As illustrated, the outer surfaces of the inner rings 7—8 adjacent the mutually abutting ends thereof are preferably slightly tapered back from the ends, as indicated at 12—12, and a coupling sleeve preferably in the form of a spirally coiled spring 13 is passed over the surfaces 12—12, which spring, due to its inherent resiliency, serves to frictionally couple the ring parts 7—8 together.

By rotating the ring parts 7—8 relatively to each other in a direction to uncoil the spring 13, the ring parts 7—8 may be quite readily separated from each other and during assembling the ring parts 7—8 are likewise preferably rotated relatively to each other, so as to tend to uncoil the spring 13 and thus facilitate assembly of the rings.

It will be seen that in a bearing as thus far disclosed the operations of filling the raceways with balls or the assembly of balls in cages with the raceways and the subsequent assembly of the inner and outer rings with interposed anti-friction bearing members are all relatively simple operations.

If disassembly of the bearing becomes necessary such disassembly may be readily effected, as stated, by slightly rotating the rings 7—8 relatively to each other in a direction to uncoil the spring, thereby releasing its grip, and then pulling the two rings outwardly so as to separate the same.

In the form shown in Fig. 2 the inner ring is provided with outwardly extending flanges 14—15 which extend into relatively close proximity to the adjacent inner side of the outer ring and in effect provide a housed or sealed bearing.

In the form shown in Fig. 1 the inner ring parts are not provided with integral flanges but a separate felt seal 16 is carried by one of the rings, such as the inner ring, and seals the space between the inner and outer rings.

Fig. 1 illustrates one form of mounting for the bearing, in which 17 indicates a mine car wheel or the like, which is counterbored, as indicated at 18, for the reception of the outer bearing ring 5. The inner ring parts 7—8 are mounted on the end of the shaft or axle 19 and are rigidly secured between the abutment collar 20, engaging the shoulder 21 on the axle or shaft, and the castellated nut 22, screwed onto the end of the shaft, as will be apparent. The retaining flange ring 23 may be secured to the car wheel, as by means of through-bolts 24 and serves to abut the end of the ring 5 for securing the same rigidly in place in its counterbore.

In order to facilitate application of the bearing the relatively abutting ends of the rings 7—8 are preferably tapered or chamfered, as indicated at 25, so that if the two rows of balls do not hold the rings in strict axial alignment there will be no sharp shoulder for the end of the shaft 19 to engage and prevent the slipping of the inner ring onto the shaft. The chamfered or tapered edges 25 readily ride over the end of the shaft, so that the bearing may be assembled with the shaft with substantially the same ease as if the inner ring were in a single part. When the inner ring is assembled with the shaft 19 and secured in place thereon, the two ring parts 7—8 are rigidly held together and act substantially the same as if the inner ring were in one part.

All parts of the bearing are exceedingly simple and cheap to manufacture and the completed bearing is quite serviceable and for many uses is fully as good as the more expensive types of bearings. The coupling sleeve 13 is positioned between the two rows of balls and in the space between the inner and outer rings, so as to be invisible from the outside and so as to be out of the way.

As shown the length of the sleeve is such as to space the ring parts 7—8 apart sufficiently during the operation of filling the raceways with balls so that when one raceway is filled the bearing may be turned over and the other raceway filled, after which the two parts 7—8 may be crowded toward each other into final position where they will be frictionally held for safe packing and transportation.

While the invention has been described in considerable detail and preferred forms shown it is to be understood that various changes and modifications may be made within the scope of the invention as defined in the appended claims.

I claim:

1. A double row angular contact bearing comprising, an integral outer ring having two spaced raceways, the normals of the lines of contact of which converge outwardly of said ring, a two part separable inner ring having raceways complementary to those of the outer ring, a coupling overlapping and frictionally engaging the outer walls of the adjacent inner ends of said inner ring parts and in the space between the inner and outer bearing rings, the length of said coupling being sufficient to first hold said parts in one position for the operation of loading all raceways with balls and thereafter in another position for normal operation.

2. A double row angular contact bearing comprising, an integral outer ring having two spaced raceways, the normals of the lines of contact of which converge outwardly of said ring, an inner ring comprised of two separable parts having reduced inner ends and having raceways on their outer ends complementary to those of the outer ring, a spirally wound coil spring coupling overlapping the outsides of the reduced inner ends of said inner ring parts and in the space between the inner and outer rings and engaging friction-tight on the inner ring parts and adjustable thereon to space said parts in two different operative positions.

3. A double row angular contact bearing comprising, an integral outer ring having two spaced raceways, the normals of the lines of contact of which converge outwardly of said ring, a two part inner ring having raceways complementary to those on the outer ring, a coupling sleeve overlapping and hugging the adjacent inner ends of said inner ring parts and located between the raceways and in the space between the inner and outer rings, said coupling comprising a spirally wound coil spring of an internal diameter slightly less than the external diameter of those portions of the inner ring parts engaged thereby.

4. A double row bearing comprising, an outer ring having two spaced raceways, an inner ring having spaced raceways complementary to those on said outer ring, one of said rings being formed in two parts, one raceway being in each part, a coupling member overlapping and engaging the adjacent inner ends of said two parts and located between the raceways and in the space between said inner and outer rings, said coupling comprising a spirally wound coil spring of a diameter to tightly engage the ends of said two parts of said ring.

5. A double row bearing comprising, an outer ring having two spaced raceways, an inner ring having spaced raceways complementary to those on said outer ring, one of said rings being formed in two parts, one raceway being in each part, a coupling member overlapping and engaging the adjacent inner ends of said two parts, said coupling comprising a spirally wound coil spring of a diameter to tightly engage the ends of said two parts of said ring.

6. A double row bearing comprising, an outer ring having two spaced raceways, an inner ring having spaced raceways complementary to those on said outer ring, one of said rings being formed in two parts, one raceway being in each part, a coupling member overlapping and engaging the adjacent inner ends of said two parts, one of said rings at each end having a generally radially directed flange extended toward the other ring and into sealing proximity thereto, said flanges being substantially continuous and serving as inherent seals for the bearing.

7. A double row bearing comprising, an outer ring having two spaced raceways, an inner ring having spaced raceways complementary to those on said outer ring, one of said rings being formed in two parts, one raceway being in each part, a coupling member overlapping and engaging the adjacent inner ends of said two parts, the length of said coupling being sufficient to first hold said parts in one position for the operation of loading a pair of said raceways and thereafter in another position for normal operation.

JOHN W. SMITH.